United States Patent
Milojicic et al.

(10) Patent No.: US 11,128,531 B2
(45) Date of Patent: Sep. 21, 2021

(54) SYSTEMS AND METHODS FOR AGGREGATE BANDWIDTH AND LATENCY OPTIMIZATION

(71) Applicant: Hewlett Packard Enterprise Development LP, Houston, TX (US)

(72) Inventors: Dejan S Milojicic, Palo Alto, CA (US); Sharad Singhal, Belmont, CA (US); Andrew R. Wheeler, Ft. Collins, CO (US); Michael S. Woodacre, Winchester (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 16 days.

(21) Appl. No.: 15/967,583

(22) Filed: Apr. 30, 2018

(65) Prior Publication Data

US 2019/0334771 A1    Oct. 31, 2019

(51) Int. Cl.
| | |
|---|---|
| *H04L 12/24* | (2006.01) |
| *G06F 11/34* | (2006.01) |
| *H04L 12/911* | (2013.01) |
| *H04L 12/26* | (2006.01) |
| *G06F 11/30* | (2006.01) |

(52) U.S. Cl.
CPC ...... *H04L 41/0816* (2013.01); *G06F 11/3006* (2013.01); *G06F 11/3419* (2013.01); *H04L 43/08* (2013.01); *H04L 47/822* (2013.01)

(58) Field of Classification Search
CPC . G06F 9/5077; G06F 11/3495; H04L 41/0816
See application file for complete search history.

(56) References Cited

U.S. PATENT DOCUMENTS

| | | |
|---|---|---|
| 6,247,109 B1 | 6/2001 | Kleinsorge et al. |
| 6,691,146 B1 | 2/2004 | Armstrong et al. |
| 8,140,817 B2 | 3/2012 | Schopp et al. |

(Continued)

OTHER PUBLICATIONS

NPL dated 2014 retrieved from: https://stackoverflow.com/questions/1853284/whats-the-difference-between-the-message-passing-and-shared-memory-concurrency (Year: 2014).*

(Continued)

*Primary Examiner* — Tonia L Dollinger
*Assistant Examiner* — Ishrat Rashid
(74) *Attorney, Agent, or Firm* — Hewlett Packard Enterprise Patent Department

(57) ABSTRACT

Systems and methods for dynamically and programmatically controlling hardware and software to optimize bandwidth and latency across partitions in a computing system are discussed herein. In various embodiments, performance within a partitioned computing system may be monitored and used to automatically reconfigure the computing system to optimize aggregate bandwidth and latency. Reconfiguring the computing system may comprise reallocating hardware resources among partitions, programming firewalls to enable higher bandwidth for specific inter-partition traffic, switching programming models associated with individual partitions, starting additional instances of one or more applications running on the partitions, and/or one or more other operations to optimize the overall aggregate bandwidth and latency of the system.

28 Claims, 7 Drawing Sheets

(56) References Cited

U.S. PATENT DOCUMENTS

| | | | | |
|---|---|---|---|---|
| 8,572,606 B1* | 10/2013 | Agesen | ................ | G06F 11/004 |
| | | | | 718/1 |
| 8,621,069 B1* | 12/2013 | Tompkins | ............. | G06F 9/5027 |
| | | | | 709/224 |
| 8,947,522 B1* | 2/2015 | Hickman | ................ | H04N 7/18 |
| | | | | 348/114 |
| 9,158,565 B2 | 10/2015 | Jakoljevic et al. | | |
| 2007/0061441 A1* | 3/2007 | Landis | ................ | G06F 9/5077 |
| | | | | 709/224 |
| 2010/0217949 A1* | 8/2010 | Schopp | ................ | G06F 9/5077 |
| | | | | 711/173 |
| 2014/0109069 A1* | 4/2014 | Lee | .......................... | G06F 8/41 |
| | | | | 717/149 |
| 2014/0289341 A1* | 9/2014 | Occhipinti | ............. | H04L 51/18 |
| | | | | 709/206 |
| 2016/0224388 A1* | 8/2016 | Guttahalli Krishna | ...................... | |
| | | | | G06F 3/0664 |

OTHER PUBLICATIONS

Yang, M. et al.; "An End-to-end QoS Framework with On-demand Bandwidth Reconfiguration"; Mar. 7-11, 2004; 12 pages.

\* cited by examiner

SYSTEMS AND METHODS FOR AGGREGATE BANDWIDTH AND LATENCY OPTIMIZATION

TECHNICAL FIELD

The disclosed technology relates generally to computing system resource configuration, and more particularly, dynamically and programmatically controlling hardware and software to optimize performance across partitions in a multiprocessor system.

DESCRIPTION OF THE RELATED ART

As multiprocessor computing systems grow in size (through the addition of memory, CPUs, processing- and memory-related accelerators, interconnects, or other resources), it becomes increasingly difficult to understand and manage system performance. Software components running on large-scale systems often communicate within and across partitions utilizing different software mechanisms, such as through shared memory, message passing, sockets, or shared files. Typically, a large portion of performance capability goes into this communication. There is a need for means to measure and express communication traffic within these systems and optimize performance accordingly.

BRIEF SUMMARY OF THE EMBODIMENTS

The systems and methods described herein may reconfigure a computing system comprising a plurality of memory and computing resources. In various embodiments, the systems and methods described herein may involve a hardware controller configured to monitor network traffic within a computing system and automatically reconfigure the computing system to optimize system performance. For example, the controller may be configured to automatically reconfigure the computer system to optimize the aggregate bandwidth and/or latency across partitions within the system.

In various embodiments, the controller may be configured to measure and express the overall performance of a large scale multiprocessor system. For example, cross-partition traffic may be measured by leveraging interconnect mechanisms, and the overall performance may be expressed by the aggregate bandwidth and/or latency of the cross-partition traffic. The controller may be configured to programmatically determine whether the performance indicates one or more optimization operations are required. For example, the controller may be configured to compare measured bandwidth and/or latency to acceptable bandwidth and/or latency thresholds to determine whether one or more optimization operations are required. In various embodiments, the controller may be configured to execute one or more optimization operations based on partition information indicating hardware resources, partition firewalls, programming models, and/or other information for each of multiple partitions. The one or more operations may comprise reallocating hardware resources among partitions, programming firewalls to enable higher bandwidth for specific inter-partition traffic, switching programming models associated with individual partitions, starting additional instances of one or more applications running on the partitions, and/or one or more other operations to optimize the overall performance of the system.

The system may include one or more hardware processors configured by machine-readable instructions. Executing the machine-readable instructions may cause the one or more processors to monitor network traffic within a computing system and automatically reconfigure the computing system to optimize performance. In various embodiments, the one or more physical processors may be physically located within a hardware controller of the system. The one or more physical processors may represent processing functionality of multiple components of the system operating in coordination. Therefore, the various processing functionality described in relation to the one or more processors may be performed by a single component or by multiple components of the system.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices and methods for dynamically and programmatically controlling hardware and software to optimize performance in a multiprocessor system.

Large scale computing systems may include a large quantity of nodes (e.g., numbering in the thousands), each of which may have associated resources. Some large-scale computing systems may employ processing resources, memory (including, e.g., persistent memory), accelerators, and other resources that are assignable to users at levels as may be requested by the users. Operating systems and kernels may be run on some or all of the nodes, and in some cases, different types, versions, or instances of kernels may be run on different nodes in the system. The system nodes and the resources therein may communicate with each other via distributed inter-node communication over a fabric. A system controller may be provided to monitor network traffic within a computing system and automatically reconfigure the computing system to optimize system performance.

It should be noted that the terms "optimize," "optimal" and the like as used herein can be used to mean making or achieving performance as effective or perfect as possible. Moreover, techniques disclosed herein can refer to, e.g., performing calculations, etc. that result in "more accurate" determinations. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 1:
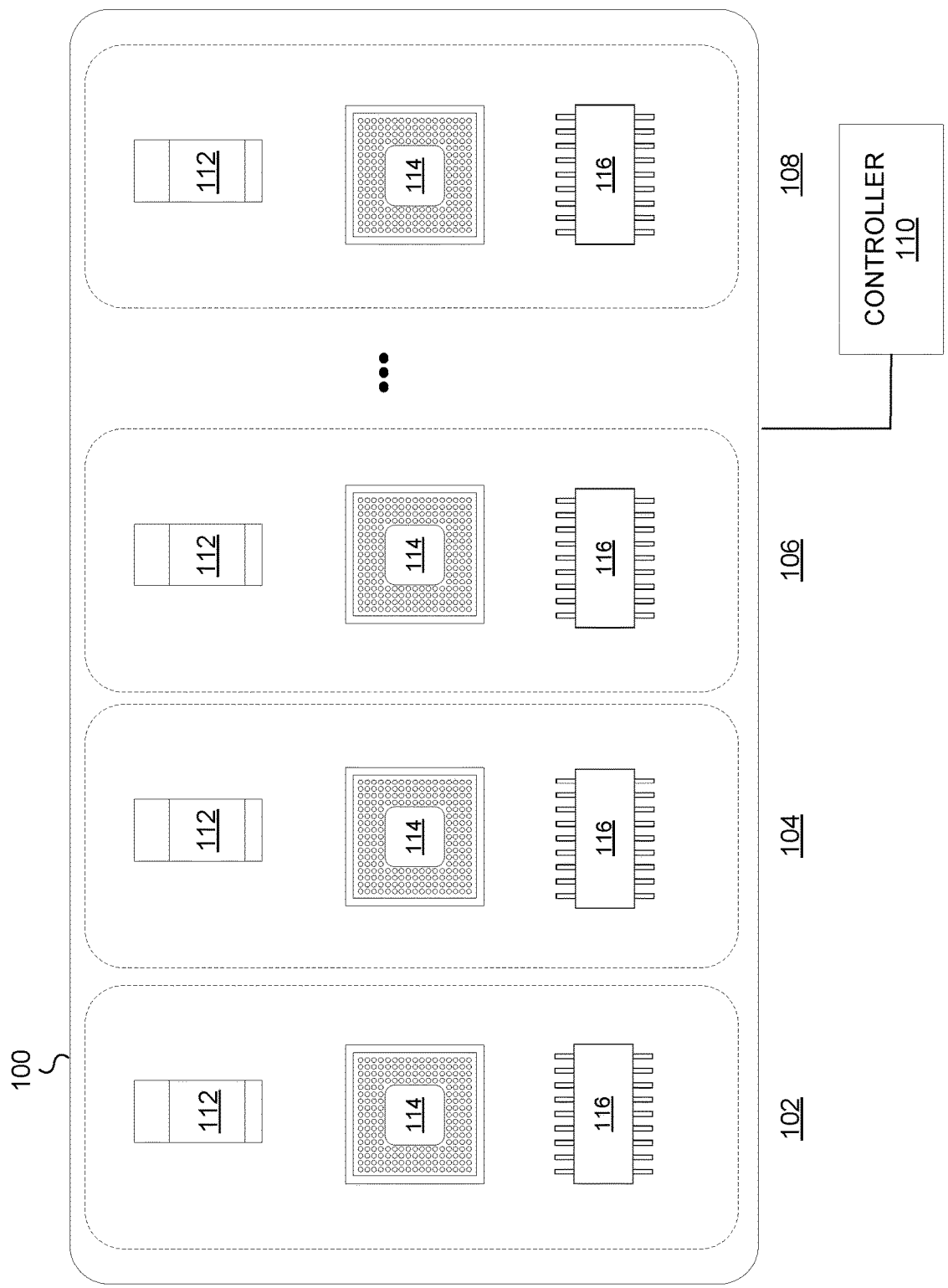
FIG. 1 depicts a block diagram of an example computing system divided into multiple partitions, each including a set of hardware components, in accordance with various embodiments.

FIG. 1 depicts a block diagram of an example computing system 100 divided into multiple partitions, each including a set of hardware components, in accordance with various embodiments. For example, the partitions may include partitions 102, 104, 106, 108, or any other quantity of partitions. Each partition may comprise a hardware environment operative to execute one or more operations of computing system 100. An operation may comprise an application, a program, and/or other computer operation executed partly or entirely by the environment of a single partition.

The hardware environment for each partition may comprise multiple hardware components configured to execute the one or more operations of computer system 100. For example, each partition may include one or more accelerators (identified in FIG. 1 as 112), one or more CPUs (identified in FIG. 1 as 114), one or more memory modules (identified in FIG. 1 as 116), and may include one or more other hardware components.

Figure 2:
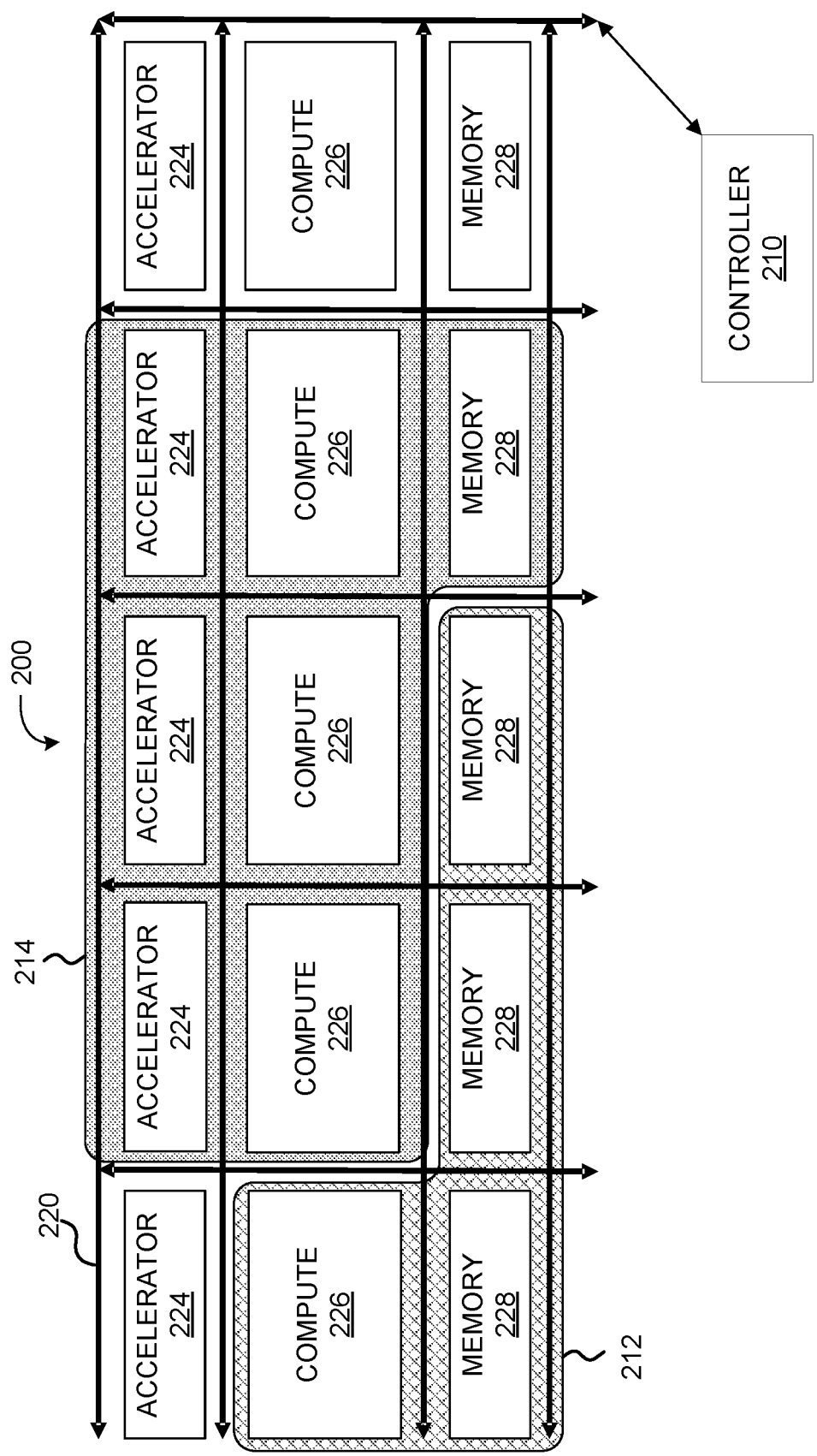
FIG. 2 provides another depiction of an example computing system, in accordance with various embodiments.

FIG. 2 provides another depiction of an example computing system 200 in accordance with various embodiments. This example computing system 200 includes a number of hardware elements within the computing environment interconnected by a fabric 220 that provides configurable interconnects between the various elements of the computing system 200. For example, fabric 220 may comprise an Ethernet fabric, a Fibre Channel fabric, or other switch fabric that includes one or more physical switches through which data may be passed between hardware elements of computing system 200. In some embodiments, fabric 220 may be designed based on at least one industry standard. For example, fabric 220 may be configured based on a Gen-Z Consortium specification, the InfiniBand® (IB) Architecture Specification, and/or one or more other industry standards now known or future developed. The hardware elements in this example computing system 200 include accelerators 224, computation resources 226, and memory elements 228. In this example, there are 5 instances of each of accelerators 224, computation resources 226, and memory elements 228. However, in various applications there may be any quantity of each of these resources. Indeed, in large-scale computing systems there may be thousands of computing nodes distributed across a number of racks or even across a number of data centers.

The computation resources 226 can include any of a number of different types of computing resources including, for example, CPUs or other general processing units, GPUs or other special processing units, and other processing resources. Accelerators 224 in some applications can serve both computing and memory functions as may be required.

The example computing system 200 of FIG. 2 depicts various hardware elements partitioned into two example partitions. In this example, a first partition 212 includes one computing resource 226 and three memory elements 228, and a second partition 214 includes three accelerators 224, three computing resources 226, and one memory element 228.

The example computing system 200 of FIG. 2 also includes a controller 210. In various embodiments, controller 210 may be configured to obtain performance measurements for example computing system 200. In various embodiments, a controller (e.g., controller 210) may be provided that is configured to measure and express overall aggregate bandwidth and/or latency across partitions of a computing system. As used herein, performance measurements may comprise measured bandwidth, measured latency, and/or one or more other performance metrics for a computing system. In some embodiments, performance measurements may be generated based on information collected at the interconnect level of a computing system. Connections between hardware elements of computing system 200 may be established at the interconnect level.

In various embodiments, a controller described herein may measure cross-partition bandwidth and/or latency within a computing system. Separate mechanisms may be utilized to measure bandwidth and latency. Bandwidth may refer to the communication capacity of a network. For example, bandwidth may be the capacity of a wired or wireless network communications link to transmit the maximum amount of data from one point to another over a computer network or internet connection in a given amount of time. In other words, bandwidth is the maximum throughput over a given communication link. Bandwidth may be measured by sending one or more files of a known size between two points and determining the time required for the file(s) to download at the destination. Latency, as used herein, can be a measure of the time it takes for data to travel from one designated point to another. Latency may be measured by sending a packet that is returned to sender, wherein the round-trip time is considered the latency. Together, bandwidth and latency may be considered the two critical indicators of communication performance within a networked system.

In some embodiments, a controller described herein may measure bandwidth and/or latency. For example, the controller may only monitor cross-partition bandwidth or only cross-partition latency within the system. In some embodiments, one or more optimization operations may be triggered based solely on measured bandwidth or measured latency. For example, optimization operations may be triggered only by aggregate bandwidth within the system or only aggregate latency within the system. However, in some embodiments, bandwidth and latency may together be monitored, and together utilized to trigger one or more optimization operations.

In some embodiments, a controller may be configured to measure and express only cross-partition bandwidth and/or latency within a computing system. In some embodiments, the system may determine aggregate bandwidth and/or aggregate latency between partitions within a computing system. In some embodiments, the controller may be configured to determine aggregate bandwidth and/or aggregate latency between partitions within a computing system. When monitoring network traffic within a large-scale partitioned system for the purposes of optimizing overall system performance, intra-partition communication may be less indicative of overall system performance than inter-partition communication (or cross-partition traffic). For example, inter-partition traffic may be far more relevant to the optimal allocation of resources between partitions in a partitioned computer system than intra-partition traffic. While the bandwidth and/or latency of intra-partition traffic may be indicative of the performance of a given partition, the aggregate bandwidth and/or latency of inter-partition traffic may be far more indicative of the performance of the system as whole. As such, in some embodiments, performance measurements utilized to dynamically and/or programmatically reconfigure a computing system may comprise cross-partition performance measurements.

In various embodiments, a controller described herein may be configured to maintain an indication of a current configuration of a computing system. The indication of the current configuration of the computing system may be included in partition information that can include one or more of the following: an indication of one or more current partitions within a computing system; resources allocated to the one or more partitions (e.g., the hardware resources such as the one or more accelerators, CPUs, and/or memory modules assigned to each partition); the location of one or more resources of the computing system; information defining one or more firewalls of the computing system; information defining one or more operations being executed by each of the one or more partitions (such as information defining applications running on components within each partition, which may include one or more programming models of the applications running on each partition); and/or other information related to the configuration of the computing system and/or individual partitions within the computing system. In various embodiments, the partition information may be stored in a memory, datastore, and/or other memory device of the system. In some embodiments, a controller may be configured to update and store partition information stored in a memory, datastore, and/or other memory device of the system.

Partition information may be obtained via user input of a system administrator, received from one or more hardware resources of the computing system, and/or determined by the controller. In various embodiments, user input may be received from a system administrator defining the location of one or more resources of the computing system, one or more firewalls of the computing system, and/or other information. For example, in some embodiments, user input may be received indicating an initial configuration of partitions within a computing system and/or resources initially allocated to one or more partitions. In some embodiments, one or more hardware resources of a computing system may provide partition information. For example, a CPU of a partition may provide an indication of one or more operations being executed within the partition (e.g., information defining an application running on components within the partition). In various embodiments, a controller described herein may be configured to maintain (or update) the partition information. For example, the controller may be configured to automatically update an indication of the current configuration of the computing system based on one or more optimization operations executed by the controller.

In various embodiments, a controller described herein may be configured to obtain an indication of a source and a destination for each of a plurality of packets transmitted within the system. Based on the source and destination for each of the plurality of packets transmitted within the system, the controller may be configured to identify individual ones of the plurality of packets that were transmitted between partitions. For example, the controller may identify individual ones of the plurality of packets that were transmitted between partitions based on partition information that indicates at least the current configuration of the computing system and resources allocated to the one or more partitions. The controller may be configured to measure, or obtain a measurement of, bandwidth and/or latency across partitions based on the identification of packets that were transmitted from one partition to another.

In some embodiments, network traffic within a computing system may be monitored in a centralized manner. For example, cross-partition traffic within a computing system may be monitored by a centralized controller and/or router. In some embodiments, network traffic within a computing system may monitored in a distributed manner. For example, in a computing system comprising a number of switches and routers, a router at each interconnect may be configured to monitor cross-partition traffic and transmit performance measurements to a controller (such as controller 210) that is configured to express, for example, the overall aggregate bandwidth and/or latency within the computing system and utilize those performance measurements to dynamically and/or programmatically reconfigure the computing system.

In various embodiments, a controller described herein may be configured to express aggregate performance measurements. For example, the controller may be configured to express aggregate bandwidth and/or latency across partitions. In some embodiments, the controller may be configured to express the aggregate bandwidth and/or latency across partitions by averaging the bandwidth and/or latency measured at individual partitions. The average of the bandwidth and/or latency measured for at least two partitions may comprise the aggregate bandwidth and/or latency across partitions in the computing system. Based on expressed performance measurements, the controller may be configured to identify one or more pathological cases in a partitioned computing system. For example, a pathological case may comprise a communication bottleneck and/or other indication of less than optimal performance by the computing system.

In various embodiments, a controller described herein may be configured to identify one or more pathological cases within a partitioned computing system by comparing the performance measurements (e.g., the aggregate bandwidth and/or latency across partitions) to known boundaries or thresholds. For example, boundaries and/or thresholds for performance measurements of a computing system may be user-defined. In some embodiments, various boundaries and/or thresholds may be established for bandwidth and/or latency. In some embodiments, boundaries and/or thresholds may be included within, or stored in association with, partition information for a computing system.

Figure 3:
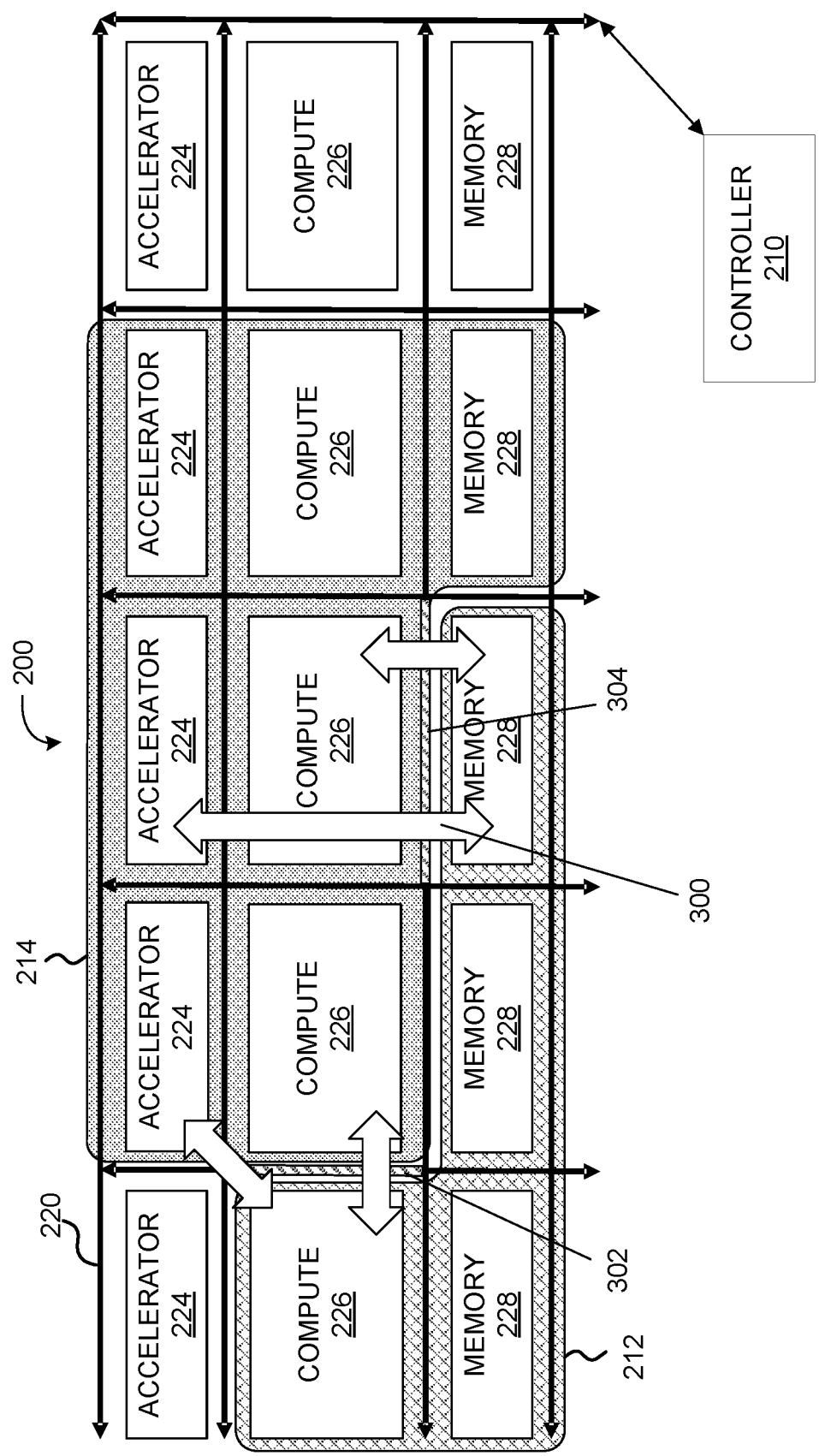
FIG. 3 depicts an example of the computing system of FIG. 2, in which additional bandwidth is made available to partitions based on cross-partition traffic, in accordance with various embodiments.

FIG. 3 depicts an example of the computing system 200 of FIG. 2, in accordance with various embodiments. In this example, cross-partition traffic may be represented by one or more arrows between hardware elements of first partition 212 and hardware elements of second partition 214. For example, cross-partition traffic between one memory element 228 of first partition 212 and one accelerator of second partition 214 may be represented by arrow 300.

As described above, controller 210 may be configured to measure and express the overall performance of the computing system 200. The overall performance may be expressed by the aggregate bandwidth and/or latency of the cross-partition traffic. For example, controller 210 may be configured to obtain an indication of bandwidth and/or latency for traffic between various hardware elements of computing system 200 and identify communication between hardware elements of different partitions (i.e., traffic between a hardware element of one partition and a hardware element of a different partition), such as cross-partition traffic between one memory element 228 of first partition 212 and one accelerator of second partition 214 may be represented by arrow 300. Based on the performance for the traffic between various hardware elements and the identification of communication between hardware elements of different partitions (i.e., "cross-partition traffic"), controller 210 may be configured to express the overall performance of computing system 200. If first partition 212 and second partition 214 are the only partitions within computing system 200, the overall performance of computing system 200 may be based solely on communication between first partition 212 and second partition 214. Controller 210 may further be configured to identify one or more pathological cases within computing system 200 by comparing the performance measurements (e.g., the aggregate cross-partition bandwidth and/or latency between first partition 212 and second partition 214) to known boundaries or thresholds.

In various embodiments, a controller described herein (such as controller 210) may be configured to automatically reconfigure a computing system (such as computing system 200) by executing one or more optimization operations (also referred to herein as reconfiguration operations) based on performance measurements for the computing system, such as the aggregate cross-partition bandwidth and/or latency of the computing system. For example, the controller may be configured to automatically reconfigure a computing system by executing one or more optimization operations based on identified pathological cases within the computing system. An optimization operation may comprise a hardware- or software-based operation configured to improve the overall performance of a computing system. A hardware-based optimization operation (or hardware-based reconfiguration operation) may comprise programming firewalls that control access to hardware elements within one or more partitions, reallocating hardware resources among partitions, or another hardware-based operation. A software-based optimization operation (or software-based reconfiguration operation) may comprise switching a programming model of at least one application running on a partition, starting an additional instance of at least one program running on a partition, or another software-based operation.

In various embodiments, a controller described herein may be configured to trigger one or more optimization operations. For example, the controller may be configured to determine whether one or more optimization operations are required and/or determine one or more optimization operations to execute within a computing system based on performance measurements for the system. In some embodiments, a controller may be configured to apply different weights to measured bandwidth and measured latency to determine which optimization operations to execute. For example, certain optimization operations may be better suited for addressing different pathological cases. In other words, when measured latency falls below an acceptable threshold but measured bandwidth is at an acceptable level, one or more specific optimization operations may be preferred. While when both measured latency and measured bandwidth fall below an acceptable threshold, a different one or more specific optimization operations may be preferred.

In various embodiments, each optimization operations may be associated with predefined weights for measured latency and measured bandwidth. By applying different predefined weights to measured latency and measured bandwidth, and/or the comparison of each of measured latency and measured to one or more respective boundaries or thresholds, the controller may be configured to trigger one or more optimization operations. As such, each optimization operation may be triggered by a different set of performance measurements.

In various embodiments, the controller may be configured to determine whether one or more optimization operations are required within a computing system based on performance measurements for the computing system, by comparing the performance measurements to known boundaries or thresholds, and/or based on one or more identified pathological cases. In some embodiments, the controller may be configured to determine that one or more optimization operations are required and execute one or more optimization operations based on that determination. In some embodiments, the controller may be configured to determine that one or more optimization operations are not required. For example, the controller may compare the performance measurements to at least one known boundary or threshold. If the performance measurements are within acceptable boundaries (or have not exceeded or fallen below a specified threshold), the controller may determine that one or more optimization operations are not required.

In various embodiments, a controller described herein may determine one or more optimization operations to execute within a computing system based on performance measurements for the system, one or more identified pathological cases, and/or partition information that indicates at least the current configuration of the computing system. For example, the controller may compare an identified pathological case within a computing system to partition information for the computing system to determine one or more optimization operations to execute.

In various embodiments, a controller described herein may be configured to reprogram one or more firewalls that control access to hardware elements within one or more partitions. Reprogramming the firewalls between partitions in a computing system may alter communication traffic between resources in the respective partitions. For example, the controller may reprogram interconnect firewalls in order to adjust the quality of service (QoS) within the computing system. The firewalls may be reprogrammed in an effort to optimize hardware-supported aggregate bandwidth and/or latency within the computing system. For example, the controller may be configured to reprogram firewalls within a computing system to enable higher bandwidth for specific inter-partition traffic. FIG. 3 depicts an example of the computing system 200 of FIG. 2, in which additional bandwidth is made available to partitions based on cross-partition traffic, in accordance with various embodiments. Specifically, controller 210 may be configured to reprogram firewalls between first partition 212 and second partition 214 (e.g., first firewall 302 and second firewall 304) to make more bandwidth available in parts of computing system 200 in which there is higher communication traffic. In other words, as noted above, optimizing the performance of computing system 200 may be based solely on bandwidth considerations.

In some embodiments, a controller described herein may be configured to identify one or more firewalls to reprogram in a computing system based on performance measurements indicating cross-partition traffic within the computing system. The firewalls that are reprogrammed may comprise firewalls that control access to at least one of the memory and computing resources of a plurality of partitions within the computing system. For example, controller 210 depicted in FIGS. 2-4 may be configured to automatically identify and reprogram first firewall 302 and second firewall 304 based on performance measurements that indicate greater cross-partition traffic at first firewall 302 and second firewall 304. As can be seen by the number of arrows traversing first firewall 302 and second firewall 304, first firewall 302 and second firewall 304 may represent two firewalls that represent a larger percentage of cross-partition traffic within computing system 200. In some embodiments, the firewalls that are reprogrammed may be identified (e.g., by a controller) based on partition information for a plurality of partitions within a computing system.

In various embodiments, a controller described herein may be configured to repartition a computing system. Repartitioning a computing system may comprise reallocating hardware resources among partitions. For example, the controller may be configured to automatically assign additional memory or computing resources to one or more partitions of a computing system. Allocating additional hardware elements to a partition may not alter aggregate cross-partition communication, but the communication traffic between hardware elements of the partition may be reduced. Any of a number of different partitioning operations can be made to partition the resources in order to improve with the performance of a computing system. For example, by adding additional resources to one or more partitions, overall aggregate latency within the computing system may be improved. While the aggregate inter-partition communication may not be affected by adding additional resources to one or more partitions, the latency between individual components within different partitions will be improved, thus improving overall aggregate latency within the system. In other words, as noted above, optimizing the performance of computing system 200 may be based solely on latency considerations.

Figure 4:
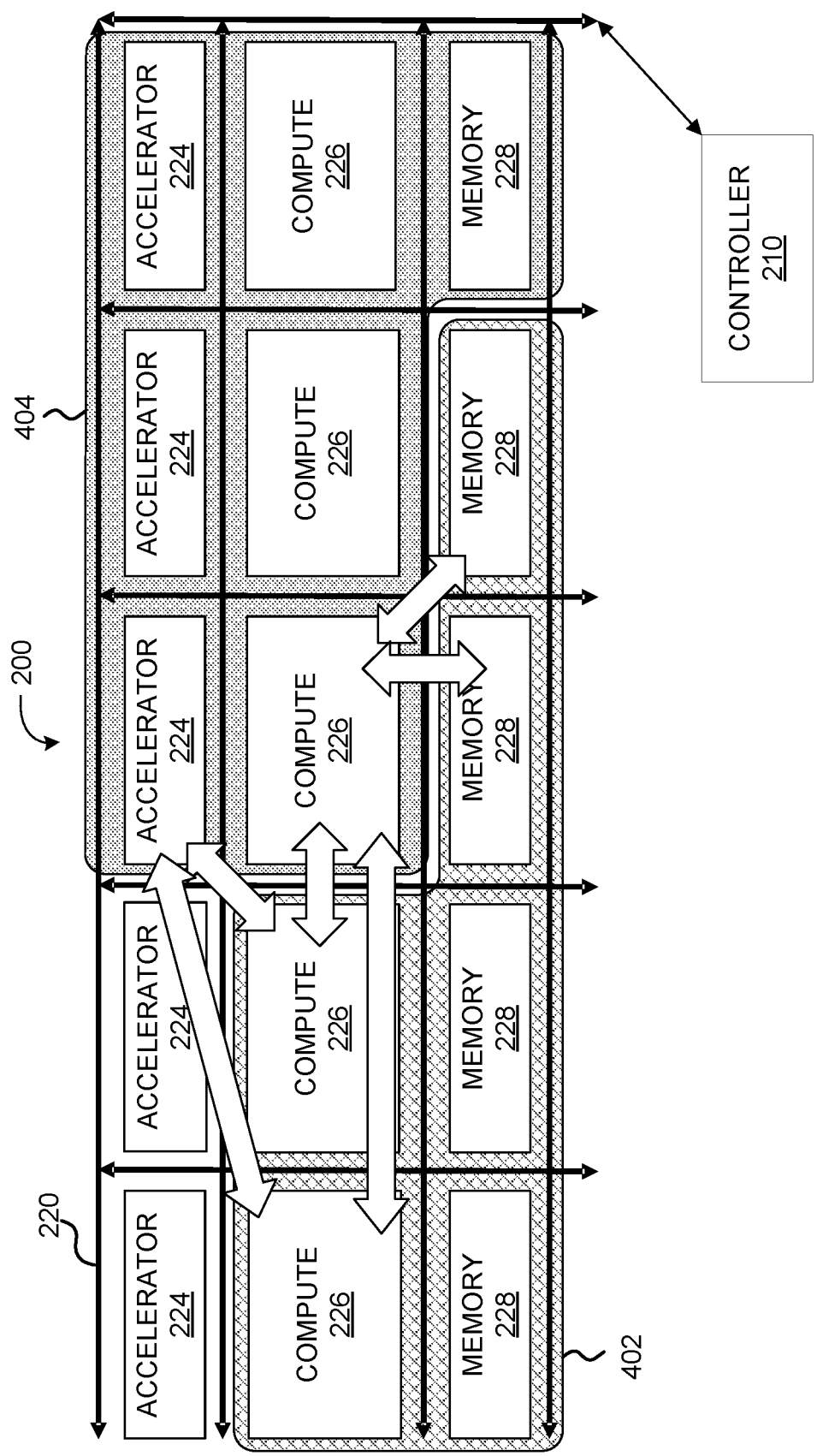
FIG. 4 depicts an example of the computing system of FIG. 2, in which resources have been reallocated to partitions based on cross-partition traffic, in accordance with various embodiments.

FIG. 4 depicts an example of computing system 200 of FIG. 2, in which resources have been reallocated to partitions based on cross-partition traffic, in accordance with various embodiments. Specifically, controller 210 may be configured to reallocate hardware resources between first partition 212 and second partition 214. Before computing system 200 was repartitioned (as seen in FIG. 2), first partition 212 included one computing resource 226 and three memory elements 228, and second partition 214 included three accelerators 224, three computing resources 226, and one memory element 228. After computing system 200 was repartitioned (as seen in FIG. 4), third partition 402 (or repartitioned first partition 212) includes two computing resources 226 and four memory elements 228, and fourth partition 404 (or repartitioned second partition 214) includes three accelerators 224, three computing resources 226, and one memory element 228. As described herein, first partition 212 and third partition 402 may each comprise a hardware environment operative the execute the same one or more operations, and second partition 214 and fourth partition 404 may each comprise a hardware environment operative the execute the same one or more operations.

In some embodiments, a controller described herein may be configured to identify one or more partitions to be repartitioned. For example, the controller may be configured to identify one or more hardware resources to be allocated to or removed from one or more partitions. For example, controller 210 depicted in FIG. 4 may be configured to automatically determine that allocating an additional computing resource (e.g., computing resource 226) to first partition 212 may improve overall aggregate bandwidth and/or latency of computing system 200. Based on that determination, controller 210 may be configured to allocate an additional computing resource (e.g., computing resource 226) to first partition 212 (creating third partition 402).

In various embodiments, a controller described herein may be configured to repartition a computing system based on partition information that indicates at least the current configuration of the computing system and resources allocated to the one or more partitions. For example, the partition information may include an indication of a location of one or more resources (or hardware element) in a computing system. In some embodiments, the controller may be configured to determine the proximity of one or more resources to a given partition based on the partition information. The controller may be configured to allocate at least one resource to a given partition based on the proximity of the resource to the given partition.

The partitions illustrated in the Figures described herein (such as first partition 212 and second partition 214 depicted in FIG. 2) show the resources in each partition grouped in blocks in which the resources of a given partition are adjacent to one another. This adjacency of resources of a given partition may be beneficial for system efficiencies, but is not required for partitioning. Resources from other non-adjacent locations within a computing system or from locations in other computing systems can be selected for a given partition. Indeed, in some instances this may be required depending on the availability of resources throughout the computing system. A controller described herein may be configured to rearrange resources to make partitioning more efficient as resources become available.

In some embodiments, repartitioning may comprise allocating one or more unused hardware resources to a partition. In some embodiments, repartitioning may comprise removing one or more hardware resources from one partition and allocating the one or more hardware resources that were removed to a different partition. In some embodiments, multiple partitions may be repartitioned in order to add one or more hardware elements to a single partition. For example, in FIG. 4, in order to allocate an additional computing resource 226 and an additional memory element 228 to first partition 212, a computing resource 226 and a memory element 228 may be removed from second partition 214 and added to first partition 214 (creating third partition 402).

Figure 5:
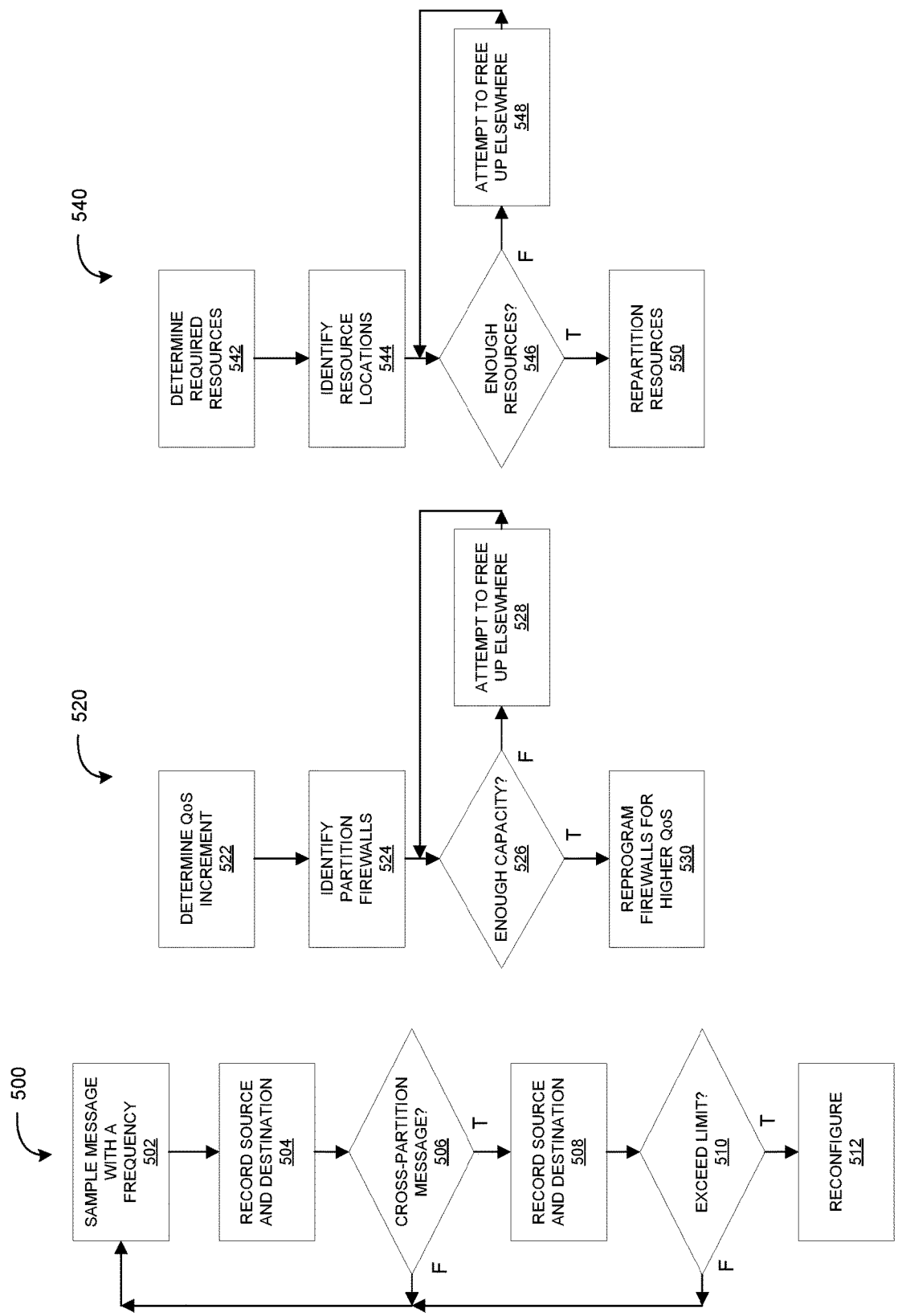
FIG. 5 contains operational flow diagrams illustrating example workflows for monitoring system communication across partitions and reconfiguring the system using one or more optimization operations, in accordance with various embodiments.

FIG. 5 contains operational flow diagrams illustrating example workflows 500, 520, and 540 for monitoring system communication across partitions and reconfiguring the system using one or more optimization operations, in accordance with various embodiments. In some embodiments, example workflows 500, 520, and 540 may algorithms involved or included within the machine-readable instructions that configure a controller and/or one or more other processors to perform the functions described herein.

Example workflow 500 depicts a process for monitoring system communication across partitions, in accordance with various embodiments. Operation 502 may comprise obtaining a sample message with a frequency. Operation 504 may comprise obtaining an indication of a source and a destination for the message. Operation 506 may comprise determining whether the message was transmitted from one partition to another. If so, operation 508 may comprise recording the source and destination of the message. Operation 510 may comprise determining, based on source and destination recorded for one or more messages, whether the number of messages transmitted between one or more partitions exceeds a limit (e.g., a predefined boundary or threshold). If so, operation 512 may comprise reconfiguring the system to optimize system performance. For example, reconfiguring the system may comprise executing one or more optimization operations described herein.

Example workflow 520 depicts a process for reprogramming one or more firewalls that control access to hardware elements within one or more partitions, in accordance with various embodiments. Operation 522 may comprise determining a QoS increment. Operation 524 may comprise identifying one or more partition firewalls. For example, partition firewalls may be identified based on partition information indicating one or more partition firewalls. Operation 526 may comprise determining whether there is enough capacity to reprogram one or more firewalls to adjust the QoS within the computing system. If not, operation 528 may comprise attempting to free up capacity elsewhere. After attempting to free up capacity elsewhere, operation 526 may again assess whether there is enough capacity to reprogram one or more firewalls to adjust the QoS within the computing system. Operation 526 and operation 528 may repeat until it is determined that there is enough capacity to reprogram at least one firewall to adjust the QoS within the computing system. Operation 530 may comprise reprogramming at least one firewall to adjust QoS within the computing system.

Example workflow 540 depicts a process for repartitioning a computing system. Operation 542 may comprise determining required resources by one or more partitions. Operation 544 may comprise identifying locations for one or more resources available by the computing system to be assigned to one or more partitions. In some embodiments, the resources may comprise one or more hardware elements described herein. For example, the required resources may be determined and the location of one or more resources may be identified based on partition information that indicates at least the current configuration of the computing system and resources allocated to the one or more partitions. Operation 546 may comprise determining whether there are enough resources to repartition the computing system. In other words, operation 546 may comprise determining whether there are enough hardware elements to be reallocated in the computing system. If not, operation 548 may comprise attempting to free up resources elsewhere. After attempting to free up resources elsewhere, operation 546 may again assess whether there are enough resources to repartition the computing system. Operation 546 and operation 548 may repeat until it is determined that there are enough resources to repartition the computing system. Operation 550 may comprise repartition the computing system by reallocating resources among one or more partitions.

In various embodiments, a controller described herein may be configured to trigger one or more software-based optimization operations to improve aggregate bandwidth and latency within a computing system. For example, the controller may trigger one or more software-based optimization operations based on performance measurements for the system. A software-based optimization operation may comprise switching a programming model of at least one application running on a partition, starting an additional instance of at least one program running on a partition, or another software-based operation. Software-based optimization operations, and the related functions described below, may be implemented by a controller described herein and/or one or more other processors of a computing system.

In various embodiments, a controller described herein may be configured to switch the programming model of one or more applications running on the partitions. In some embodiments, a call (or upcall) from a lower-level system (such as a kernel or framework) to a higher-level system (such as user code) may be utilized to switch a programming model of an application running on a partition. In various embodiments, a controller described herein may be configured to switch the programming model of an application running on a partition by sending an upcall to a higher-level system. For example, when performance measurements are determined to be unacceptable, a controller may be configured to transmit an upcall to the programming model to switch the programming model to a more efficient communication mechanism. For example, performance measurements may indicate high cross-partition communication traffic between two partitions (or hardware elements in two different partitions). Based on the performance measurements, a controller described herein may be configured to switch a programming model to address the high cross-partition communication traffic. For example, the controller may be configured to trigger a programming model of one or more of the applications within the two partitions to be switched to a more efficient communication mechanism. Switching to a more efficient communication mechanism may comprise switching to a more efficient message passing mechanism. For example, switching the programming model of one or more of the applications within the two partitions may comprise switching from message passing to shared memory.

In various embodiments, a controller described herein may be configured to start an additional instance of one or more programs running on the partitions. For example, the controller may be configured to start an instance of a program in C implementation instead of python implementation. In some embodiments, the controller may be configured to determine an additional instance of one or more programs to start based on partition information indicating applications running on one or more partitions. Certain lower-level applications may comprise intense shared memory communication, whereas higher-level applications may comprise more message passing and less intense communication. In an exemplary embodiment, network traffic within a computing system may be monitored and information characterizing the network traffic may be obtained. For example, this information characterizing the network traffic (e.g., performance measurements) may comprise aggregate latency for communication within the system. In some implementations, a controller may be configured to compare the performance measurements to acceptable thresholds. Based on the comparison and stored knowledge of one or more applications running on a given partition (which may be stored in, or in association with, partition information), the controller may be configured to start an additional instance of a lower-level application or a higher-level application in order to optimize bandwidth and/or latency within the computing system. In various embodiments, a controller described herein may be configured to start an additional instance of a program running on a partition by sending an upcall to a higher-level system. For example, the controller may be configured to transmit an upcall to the programming model to start an additional instance of a program running on the partition.

In various embodiments, a controller described herein may interface with one or more layers within the computing system. In some embodiments, the controller may interface with an interconnect level, a transport layer, a session layer, an application layer, and/or one or more other layers or levels of a computing system. For example, the controller may interface with an interconnect level to obtain and/or generate performance measurements for the system or interface with the transport layer to optimize traffic down a certain port or fabric interface based on measured network traffic. In some implementations, the controller may configured to execute one or more software-based optimization operations by interfacing with one or more layers within the computing system. For example, the controller may be configured to send upcalls to higher layers within the computing system to switch a programming model of an application operating within a partition or start an additional instance of a program running on a partition.

In various embodiments, a controller described herein may be configured to automatically perform the one or more functions described herein. For example, based on performance measurements obtained, the controller may be configured to express overall aggregate bandwidth and latency across partitions and/or reconfigure the computing system to optimize aggregate bandwidth and latency without further input from a user.

Various features described herein are described as being performed by one or more hardware processors configured by machine-readable, computer program instructions. Executing the instructions may cause the one or more processors to monitor network traffic within a computing system and automatically reconfigure the computing system to optimize performance. In various embodiments, the one or more physical processors may be physically located within a hardware controller of a computing system. In some embodiments, some or all of the features described herein may be performed by a controller of a computing system. In some embodiments, some or all of the features described herein may be performed by one or more other processors that are configured to execute the features described herein by machine-readable instructions.

Figure 6:
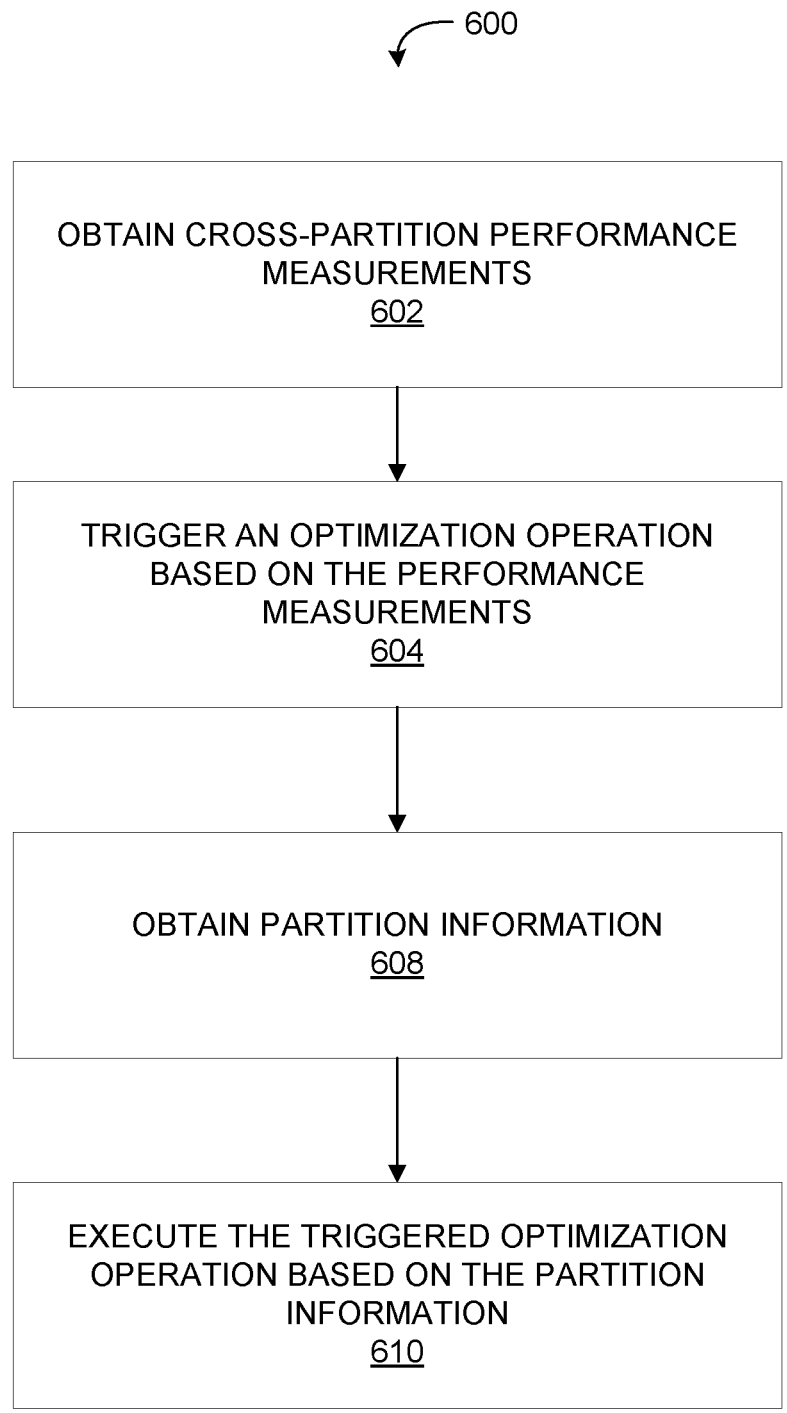
FIG. 6 is an example of a method for dynamically and programmatically controlling hardware and software to optimize network traffic performance across partitions in a computing system, in accordance with various embodiments.

FIG. 6 is an example of a method 600 for dynamically and programmatically controlling hardware and software to optimize network traffic performance across partitions in a computing system, in accordance with various embodiments. The operations of method 600 presented below are intended to be illustrative and, as such, should not be viewed as limiting. In some implementations, method 600 may be accomplished with one or more additional operations not described, and/or without one or more of the operations discussed. In some implementations, two or more of the operations may occur substantially simultaneously. The described operations may be accomplished using some or all of the system components described in detail above.

In some embodiments, method 600 may be implemented in one or more processing devices (e.g., a digital processor, an analog processor, a digital circuit designed to process information, a central processing unit, a graphics processing unit, a controller, a microcontroller, an analog circuit designed to process information, a state machine, and/or other mechanisms for electronically processing information). The one or more processing devices may include one or more devices executing some or all of the operations of method 600 in response to instructions stored electronically on one or more electronic storage mediums. The one or more processing devices may include one or more devices configured through hardware, firmware, and/or software to be specifically designed for execution of one or more of the operations of method 600.

In an operation 602, method 600 may include obtaining cross-partition performance measurements for a computing system. Performance measurements may comprise measured bandwidth, measured latency, and/or one or more other performance metrics for a computing system. In some embodiments, performance measurements may be generated based on information collected at the interconnect level of a computing system. For example, a controller described herein may interface with one or more layers (or levels) within a computing system. In some embodiments, the controller may interface with an interconnect level to obtain and/or generate performance measurements for the system. In some embodiments, network traffic may be monitored at the interconnect level and information characterizing the network traffic may be transmitted to the controller. The controller may utilize the information characterizing the network traffic as described herein to automatically reconfigure the computing system to optimize system performance. In some embodiments, only cross-partition bandwidth and latency may be measured and expressed within a computing system. As such, the performance measurements may comprise only cross-partition performance measurements.

In an operation 604, method 600 may include triggering an optimization operation based on the performance measurements of the computing system. Triggering an optimization operation may comprise determining whether one or more optimization operations are required and/or determining one or more optimization operations to execute within a computing system based on performance measurements for the system. In some embodiments, determining whether one or more optimization operations are required within a computing system may comprise comparing performance measurements to known boundaries or thresholds, and/or by identifying one or more pathological cases based on the performance measurements. In various embodiments, one or more optimization operations to execute may be determined based on performance measurements for the system, one or more identified pathological cases, and/or partition information that indicates at least the current configuration of the computing system.

In an operation 608, method 600 may include obtaining partition information. The partition information may include an indication of the current configuration of the computing system, an indication of one or more current partitions within a computing system, resources allocated to the one or more partitions (e.g., the hardware resources such as the one or more accelerators, CPUs, and/or memory modules assigned to each partition), the location of one or more resources of the computing system, information defining one or more firewalls of the computing system, information defining one or more operations being executed by each of the one or more partitions (such as information defining applications running on components within each partition, which may include one or more programming models of the applications running on each partition), and/or other information related to the configuration of the computing system and/or individual partitions within the computing system. In some embodiments, the partition information may be maintained (i.e., generated, updated, recorded, and/or stored) by a controller described herein.

In an operation 610, method 600 may include executing a triggered optimization operation based on the partition information. For example, a controller may be configured to automatically reconfigure a computing system by executing one or more optimization operations based on identified pathological cases within the computing system. An optimization operation may comprise a hardware- or software-based operation configured to improve aggregate bandwidth and latency within a computing system. A hardware-based optimization operation may comprise programming firewalls that control access to hardware elements within one or more partitions, reallocating hardware resources among partitions, or another hardware-based operation. A software-based optimization operation may comprise switching a programming model of at least one application running on a partition, starting an additional instance of at least one program running on a partition, or another software-based operation. In some embodiments, operation 610 may execute an optimization operation as otherwise described herein.

Figure 7:
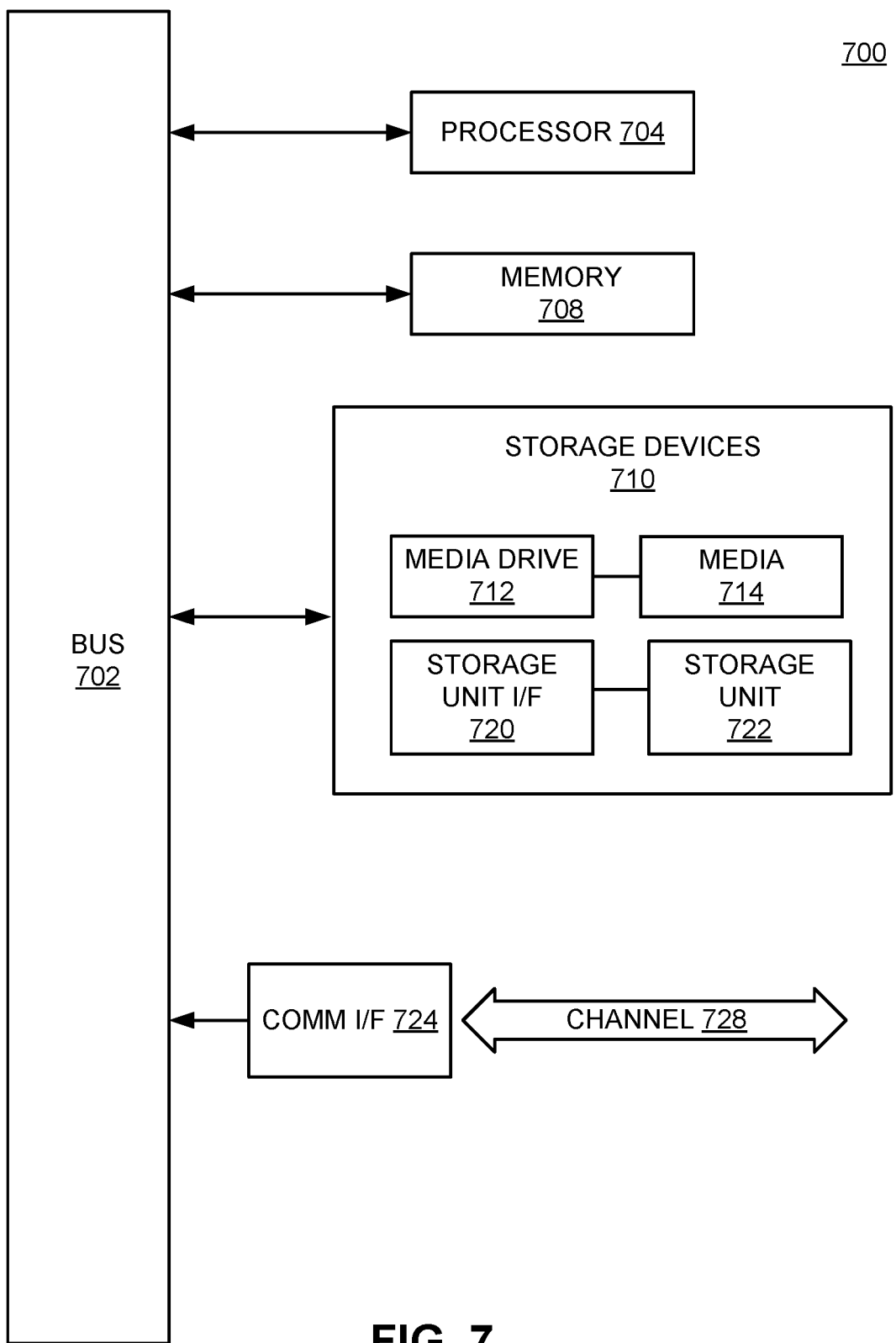
FIG. 7 illustrates an example computing module that may be used in implementing various features of embodiments of the disclosed technology.

As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where modules are implemented in whole or in part using software, in one embodiment, these software elements can be implemented to operate with a computing or processing system capable of carrying out the functionality described with respect thereto. One such example computing system is shown in FIG. 7. Various embodiments are described in terms of this example-computing system 700. After reading this description, it will become apparent to a person skilled in the relevant art how to implement the technology using other computing systems or architectures.

Referring now to FIG. 7, computing system 700 may represent computing or processing capabilities within a large-scale system comprising a plurality of hardware components of various types that may communicate within and across partitions. Computing system 700 may also represent, for example, computing or processing capabilities found within mainframes, supercomputers, workstations or servers; or any other type or group of special-purpose or general-purpose computing devices as may be desirable or appropriate for a given application or environment. Computing system 700 might also represent computing capabilities embedded within or otherwise available to a given device.

Computing system 700 might include, for example, one or more processors, controllers, control modules, or other processing devices, such as a processor 704. Processor 704 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 704 is connected to a bus 702, although any communication medium can be used to facilitate interaction with other components of computing system 700 or to communicate externally.

Computing system 700 might also include one or more memory modules, simply referred to herein as main memory 708. For example, in some embodiments random access memory (RAM) or other dynamic memory, might be used for storing information and instructions to be executed by processor 704. Main memory 708 might also be used for storing temporary variables or other intermediate information during execution of instructions to be executed by processor 704. Computing system 700 might likewise include a read only memory ("ROM") or other static storage device coupled to bus 702 for storing static information and instructions for processor 704.

The computing system 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), a flash drive, or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing system 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a flash drive and associated slot (for example, a USB drive), a PCMCIA slot and card, and other fixed or removable storage units 722 and interfaces 720 that allow software and data to be transferred from the storage unit 722 to computing system 700.

Computing system 700 might also include a communications interface 724. Communications interface 724 might be used to allow software and data to be transferred between computing system 700 and external devices. Examples of communications interface 724 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to accomplish the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for reconfiguring computing resources based on measured network traffic, the system comprising:
   a plurality of partitions, wherein each of the plurality of partitions includes at least memory and computing resources; and
   one or more physical processors programmed by computer program instructions that, when executed by the one or more physical processors, configure the system to:
      receive an indication of an application running on a partition of the plurality of partitions, wherein the application running on the partition is executed on a lower-level system including at least one of a kernel or framework;
      obtain first cross-partition performance measurements, the first cross-partition performance measurements indicating aggregate bandwidth and/or aggregate latency for traffic between the plurality of partitions;
      trigger a first reconfiguration operation including a first programming language based on the first cross-partition performance measurements;
      obtain partition information for the plurality of partitions;
      execute the first triggered reconfiguration operation based on the partition information to switch the application running on the partition of the plurality of partitions from the lower-level system to a higher-level system including at least one of user code or shared memory;

upon execution of the first triggered reconfiguration operation, obtain second performance measurements; and execute a second reconfiguration operation based on the second performance measurements, wherein the second reconfiguration operation includes switching from a message passing mechanism to a shared memory within the partition, and wherein the second reconfiguration operation starts an additional instance in a second programming language within the partition.

2. The system of claim 1, wherein to obtain the first cross-partition performance measurements, the system is further configured to:

monitor network traffic within the system.

3. The system of claim 2, wherein the system is further configured to:

determine the aggregate bandwidth and/or the aggregate latency between the plurality of partitions based on the monitored network traffic.

4. The system of claim 3, wherein to determine the aggregate bandwidth and/or the aggregate latency between the plurality of partitions, the system is configured to:

obtain an indication of a source and a destination for each of a plurality of packets transmitted within the system; and identify a subset of the plurality of packets that were transmitted between partitions, wherein the cross-partition performance measurements relate to the transmission of the identified subset of the plurality of packets.

5. The system of claim 1, wherein the system further comprises a hardware controller configured to execute the first triggered reconfiguration operation based on the partition information.

6. The system of claim 5, wherein to execute the first triggered reconfiguration operation, the hardware controller is configured to:

program firewalls that control access to at least one of the memory and computing resources of the plurality of partitions based on the partition information to alter the plurality of partitions between those resources.

7. The system of claim 5, wherein to execute the first triggered reconfiguration operation, the hardware controller is configured to:

assign additional memory or computing resources to one or more partitions of the plurality of partitions based on the partition information.

8. The system of claim 7, wherein the partition information includes an indication of a location of each of the additional memory or computing resources, wherein the hardware controller is configured to:

determine a proximity of a first resource of the additional memory or computing resources to a first partition, wherein the first resource is assigned to the first partition based on the proximity of the first resource to the first partition.

9. The system of claim 5, wherein to execute the first triggered reconfiguration operation, the hardware controller is configured to:

switch a programming model of an application running on at least one partition of the plurality of partitions.

10. The system of claim 5, wherein to execute the first triggered reconfiguration operation, the hardware controller is configured to:

start an application additional instance of one or more programs running on at least one partition of the plurality of partitions.

11. A method for reconfiguring computing resources based on measured network traffic, the method being implemented in a computer system having one or more physical processors programmed with computer program instructions that, when executed by the one or more physical processors, cause the computer system to perform the method, the method comprising:

receiving an indication of an application running on a partition of the plurality of partitions, wherein the application running on the partition is executed on a lower-level system including at least one of a kernel or framework;

obtaining first cross-partition performance measurements, the first cross-partition performance measurements indicating aggregate bandwidth and/or aggregate latency for traffic between a plurality of partitions, wherein each of the plurality of partitions includes at least memory and computing resources;

triggering a first reconfiguration operation including a first programming language based on the first cross-partition performance measurements;

obtaining partition information for the plurality of partitions;

executing the first triggered reconfiguration operation based on the partition information to switch the application running on the partition of the plurality of partitions from the lower-level system to a higher-level system including at least one of user code or shared memory;

upon execution of the first triggered reconfiguration operation, obtaining second performance measurements; and executing a second reconfiguration operation based on the second performance measurements, wherein the second reconfiguration operation includes switching from a message passing mechanism to a shared memory within the partition, and wherein the second reconfiguration operation starts an additional instance in a second programming language within the partition.

12. The method of claim 11, the method further comprising:

storing the partition information, the partition information indicating a current configuration of the plurality of partitions.

13. The method of claim 11, wherein obtaining the first cross-partition performance measurements comprises:

monitoring network traffic within the computer system.

14. The method of claim 13, the method further comprising:

determining the aggregate bandwidth and/or the aggregate latency between the plurality of partitions based on the monitored network traffic.

15. The method of claim 14, wherein determining the aggregate bandwidth and/or the aggregate latency between the plurality of partitions comprises:

obtaining an indication of a source and a destination for each of a plurality of packets transmitted within the system; and identifying a subset of the plurality of packets that were transmitted between partitions, wherein the cross-partition performance measurements relate to the transmission of the identified subset of the plurality of packets.

16. The method of claim 11, wherein executing the triggered reconfiguration operation comprises:
  programming firewalls that control access to at least one of the memory and computing resources of the plurality of partitions based on the partition information to alter the plurality of partitions between those resources.

17. The method of claim 11, wherein executing the first triggered reconfiguration operation comprises:
  assigning additional memory or computing resources to one or more partitions of the plurality of partitions based on the partition information.

18. The method of claim 17, wherein the partition information includes an indication of a location of each of the additional memory or computing resources, the method further comprising:
  determining a proximity of a first resource of the additional memory or computing resources to a first partition, wherein the first resource is assigned to the first partition based on the proximity of the first resource to the first partition.

19. The method of claim 11, wherein executing the first triggered reconfiguration operation comprises:
  switching a programming model of an application running on at least one partition of the plurality of partitions.

20. The method of claim 11, wherein executing the first triggered reconfiguration operation comprises:
  starting an additional instance of one or more programs running on at least one partition of the plurality of partitions.

21. A hardware controller configured to reconfigure computing resources in a computer system based on measured network traffic, the hardware controller comprising:
  one or more physical processors programmed by computer program instructions that, when executed by the one or more physical processors, configure the hardware controller to:
    receive an indication of an application running on a partition of a plurality of partitions, wherein the application running on the partition is executed on a lower-level system including at least one of a kernel or framework;
    store partition information, the partition information indicating a current configuration of the plurality of partitions of the computer system, wherein each of the plurality of partitions includes at least memory and computing resources;
    monitor network traffic within the computer system;
    determine aggregate bandwidth and/or aggregate latency between the plurality of partitions based on the monitored network traffic;
    identify a first reconfiguration operation including a first programming language to execute based at least on the aggregate bandwidth and/or the aggregate latency;
    execute the first reconfiguration operation based on the partition information to switch the application running on the partition of the plurality of partitions from the lower-level system to a higher-level system including at least one of user code or shared memory;
    upon execution of the first reconfiguration operation, obtain second performance measurements; and
    execute a second reconfiguration operation based on the second performance measurements, wherein the second reconfiguration operation includes switching from a message passing mechanism to a shared memory within the partition, and wherein the second reconfiguration operation starts an additional instance in a second programming language within the partition.

22. The hardware controller of claim 21, wherein to determine the aggregate bandwidth and/or aggregate latency between the plurality of partitions, the hardware controller is configured to:
  obtain an indication of a source and a destination for each of a plurality of packets transmitted within the computer system; and
  identify a subset of the plurality of packets that were transmitted between partitions, wherein the cross-partition performance measurements relate to the transmission of the identified subset of the plurality of packets.

23. The hardware controller of claim 21, wherein to execute the first reconfiguration operation, the hardware controller is configured to:
  program firewalls that control access to at least one of the memory and computing resources of the plurality of partitions based on the partition information to alter the plurality of partitions between those resources.

24. The hardware controller of claim 21, wherein to execute the first reconfiguration operation, the hardware controller is configured to:
  assign additional memory or computing resources to one or more partitions of the plurality of partitions based on the partition information.

25. The hardware controller of claim 24, wherein the partition information includes an indication of a location of each of the additional memory or computing resources, wherein the hardware controller is configured to:
  determine a proximity of a first resource of the additional memory or computing resources to a first partition, wherein the first resource is assigned to the first partition based on the proximity of the first resource to the first partition.

26. The hardware controller of claim 21, wherein to execute the first reconfiguration operation, the hardware controller is configured to:
  switch a programming model of an application running on at least one partition of the plurality of partitions.

27. The hardware controller of claim 21, wherein to execute the first reconfiguration operation, the hardware controller is configured to:
  start an additional instance of one or more programs running on at least one partition of the plurality of partitions.

28. The system of claim 1, wherein the second reconfiguration operation includes switching a messaging passing mechanism.

* * * * *